W. G. BROWN.
Perforating-Stamp.

No. 169,143. Patented Oct. 26, 1875.

Witnesses.
S. W. Piper
L. M. Möller

William G. Brown
by his attorney
N. Wilson

UNITED STATES PATENT OFFICE.

WILLIAM G. BROWN, OF MONMOUTH, MAINE.

IMPROVEMENT IN PERFORATING STAMPS.

Specification forming part of Letters Patent No. 169,143, dated October 26, 1875; application filed July 20, 1875.

*To all whom it may concern:*

Be it known that I, WILLIAM G. BROWN, of Monmouth, of the county of Kennebec, of the State of Maine, have invented a new and useful Implement or Mechanism for Canceling Postage or other Stamps; and do hereby declare the same to be fully described in the following specification and represented in the accompanying drawings, of which—

Figure 1:
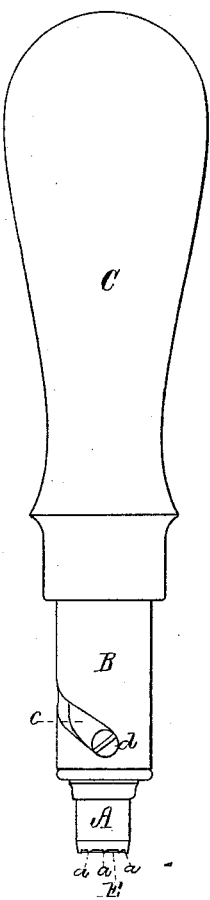
Figure 2:
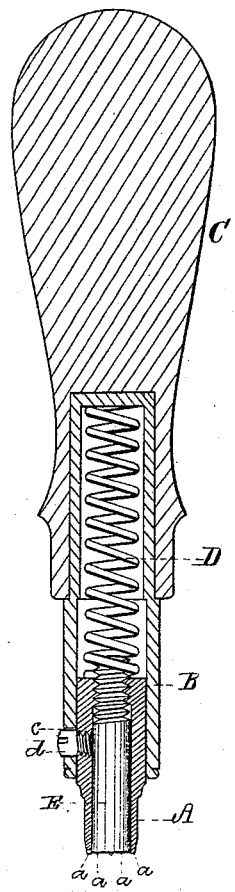
Figure 3:
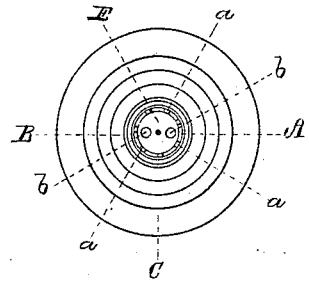

Figure 1 is a side elevation, Fig. 2 a longitudinal section, and Fig. 3 an end view, of one of my stamp-canceling implements.

It operates by abrading the postage-stamp, so as to remove from it an annulus, or a portion or portions thereof, which, when the implement is struck upon the stamp, it accomplishes by a partial revolution of the series of abrading-teeth.

In the drawings, A denotes a tubular spindle, arranged concentrically within a tubular carrier, B, fixed to and projecting from or constituting part of a handle, C, there being within the said handle a helical spring, D, to press forward the said spindle. At its outer end the spindle terminates in or has a series of teeth, $a\ a\ a$, extending from it, as shown, there being screwed lengthwise into the spindle a gage, E, which, at its outer end, is nicked or provided with two holes, $b\ b$, for reception of a screw-driver for turning the gage, in order to adjust it with reference to the teeth, so that they may not cut or tear too deep, or a depth materially greater than the thickness of the postage-stamp. The spindle-carrier has an inclined or helical slot, $c$, made in it, in manner as shown, a screw, $d$, being inserted in the said slot, and screwed into the spindle and against the gage.

The screw $d$ performs two functions—that is to say, it acts not only as a means of clamping the gage, to prevent it from turning in the spindle, but, in conjunction with the slot, it serves to cause the spindle to make a partial revolution while in the act of being moved lengthwise in the carrier.

On taking hold of the handle, and stamping the toothed end of the spindle down with force upon a postal stamp, the spindle, while in contact therewith, will be partially revolved, and will abrade the stamp, so as to cut or tear from it an annulus, or part or parts thereof. This not only will cancel the stamp, but render the cancellation at once visible or perceptible to the eye.

I am aware that a stamp to move endwise, but not revolve within its handle or carrier, and provided with an adjustable gage, is not new, such stamp being simply to cut with a sharp edge a circle in a postal stamp; therefore, I do not claim such.

There are two or more distinctive differences in my canceling implement relatively to the other hereinbefore mentioned. First, it has teeth to cause it to cut, tear, or abrade in a circular path, and it revolves, or has mechanism for turning its spindle around while the teeth thereof may be in the paper. Furthermore, the clamp-screw of the gage constitutes part of the mechanism for turning the spindle around.

I would remark that, in the place of a screw to clamp the gage, a stud may be used in the toothed spindle and the slot of the carrier, in which case another clamp-screw, or means of clamping the gage, would be required, as the stud would only operate with the slot to turn the spindle.

The clamp-screw $d$, when once screwed up against the gage, is not liable to work loose or turn on its axis while the implement may be in use, for, whichever way such screw may be moved in the slot, the latter will operate to turn or set such screw tighter.

In my canceling-stamp I use no universal joint in connection with the spindle and the canceling-cutter; nor do I use a rotating cutter provided with a flange, and combined with a head and face plate; nor do I have the helical spring to encompass a rod or shaft, for, in my stamp, the spring is wholly incased, or has an encompassing-case; and, furthermore, the canceling-cutter is tubular, and has its gage arranged within it, and to screw into it, it being confined by a screw, which answers two purposes, as set forth, all of which not only simplifies the article, but is advantageous in many respects.

I therefore claim—

The improved canceling-stamp, composed of the helically-slotted spring-case B, the tubular toothed spindle A, the spring D, the adjustable gage E, screwed into the spindle, and the clamp-screw $d$, all arranged and applied, and furnished with a handle, C, as specified and shown.

WM. G. BROWN.

Witnesses:
R. H. EDDY,
J. R. SNOW.